United States Patent [19]

Hardy

[11] Patent Number: 4,494,412

[45] Date of Patent: Jan. 22, 1985

[54] TESTING TOOL FOR STUDS AND THE LIKE

[76] Inventor: Raymond D. Hardy, 10311 Desdemona Dr., Dallas, Tex. 75228

[21] Appl. No.: 496,090

[22] Filed: May 19, 1983

[51] Int. Cl.³ .............................................. G01L 1/02
[52] U.S. Cl. .................................................... 73/761
[58] Field of Search ............................. 73/761, 862.58

[56] References Cited

U.S. PATENT DOCUMENTS 3,563,087  2/1971  Brunelle et al. ...................... 73/761

Primary Examiner—Anthony V. Ciarlante
Attorney, Agent, or Firm—F. Travers Burgess

[57] ABSTRACT

A testing tool for studs and similarly mounted fasteners comprises a cylinder having a base adapted to rest against the surface from which the stud protrudes and a piston axially movable in the cylinder with a hollow piston rod through which an enlarged threaded rod slidably extends, the end of the threaded rod adjacent the base having means to grip a stud when the base of the cylinder is seated against the stud-mounting surface. In one embodiment of the invention, a collar with handles is threadably mounted on the end of the externally threaded rod remote from the base abutting the adjacent end of the piston rod and a hydraulic pressure gauge is attached to the end portion of the cylinder nearest the base so that when the collar is rotated by its handles to apply tension to the stud, it forces the piston downwardly in the cylinder so that the pressure shown on the gauge is proportional to the tension applied to the stud. In another embodiment of the invention, a handgrip-actuated eccentric cam is mounted on the upper end of the stud-gripping rod in place of the collar threadably mounted on the stud-gripping rod for applying tension to the stud and downward pressure on the piston rod.

17 Claims, 9 Drawing Figures

U.S. Patent    Jan. 22, 1985    Sheet 3 of 3    4,494,412
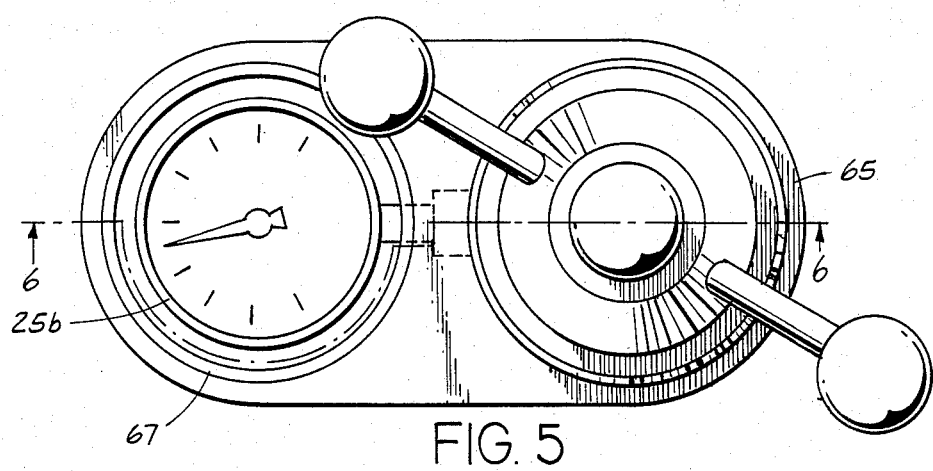
FIG. 5
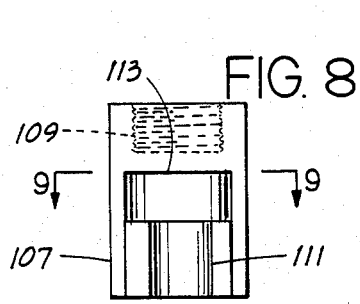
FIG. 8
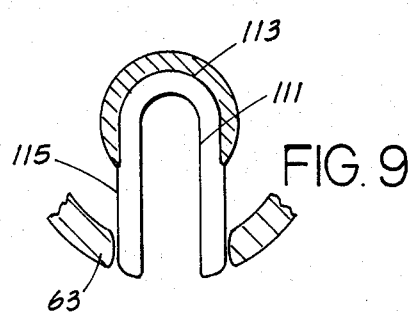
FIG. 9
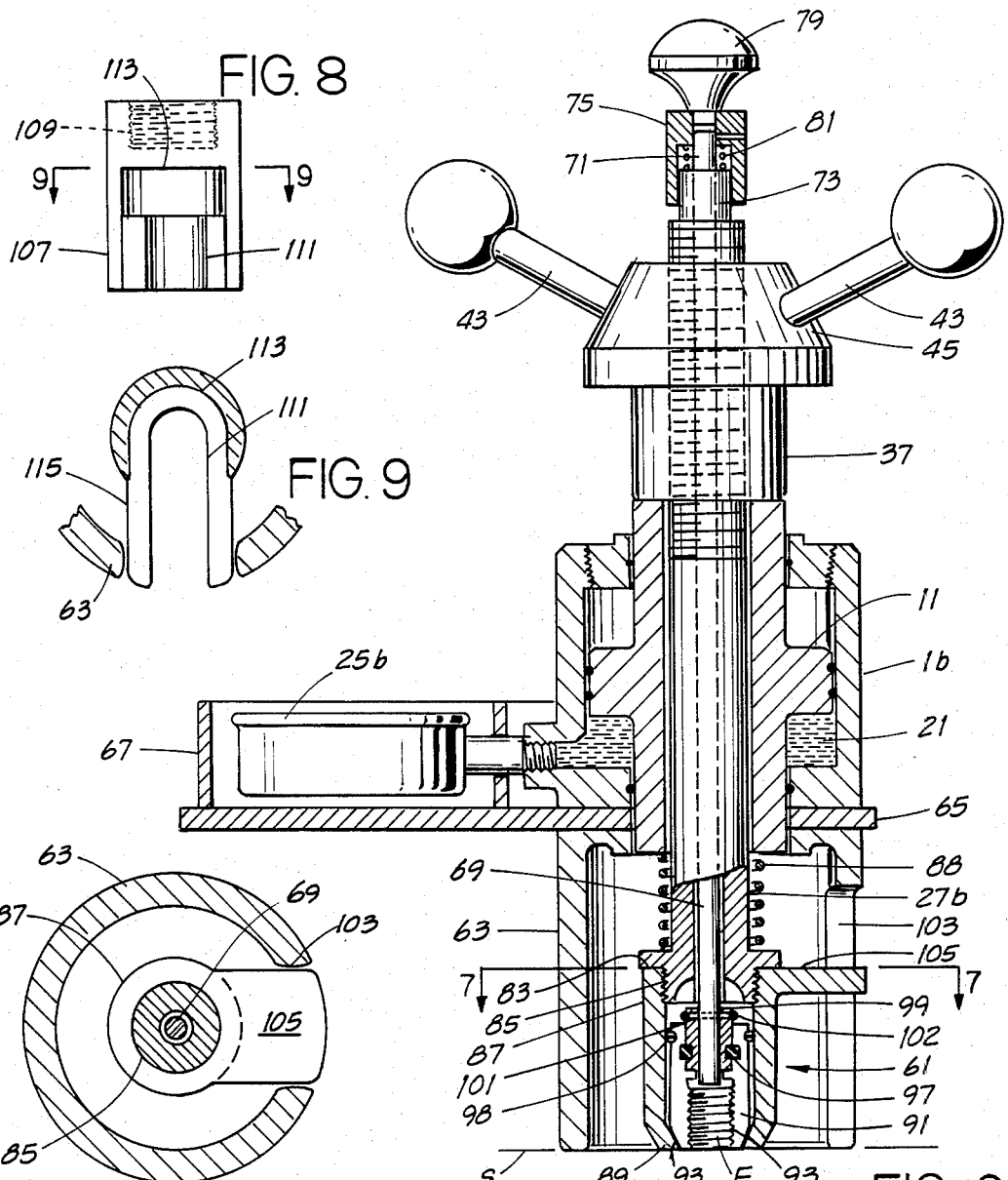
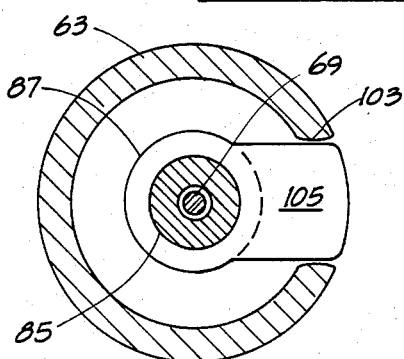
FIG. 7
FIG. 6

TESTING TOOL FOR STUDS AND THE LIKE

BACKGROUND OF THE INVENTION

1. Field of the Invention

The invention relates to tools for testing fasteners including studs and the like and particularly for determining if the fastener has the desired holding power.

2. The Prior Art

U.S. Pat. No. 3,563,087 to Brunnelle et al discloses a stud testing device having a hydraulic cylinder arranged to be seated at one end against the stud-mounting surface, a hollow piston slidably mounted in the cylinder, a hydraulic pressure gauge communicating with the cylinder and an internally threaded rod or pull screw passing through the hollow piston and arranged to threadably grip the end of the stud, a torque bar handle connected to the head 70 of the stud gripping rod so that when tension is applied to the stud by rotating rod 72 the enlarged head 70 of rod 72 causes fluid compressing movement of the piston so that the tension applied to the stud can be determined from the hydraulic pressure read on the gauge. Since tension is applied to the stud by tightening the threaded connection of rod 72 to the stud, this device is usable only with threaded studs.

SUMMARY OF THE INVENTION

An object of the invention is to provide a simple, effective hydraulic testing tool for studs and the like which is usable with blank, flat, rectangular, square or headed studs as well as threaded studs.

A more detailed object of the invention is to provide a tool for testing studs and the like incorporating means other than tension produced by tightening a threaded connection of the device to the stud for creating measurable hydraulic pressure in the device proportional to the tension applied to the stud.

The above objectives are achieved by a tool comprising a cylinder having an extension at one end engageable with the stud-mounting surface, a piston slidable in the cylinder and having rod portions extending through both ends of the cylinder, an axial aperture through the piston and piston rods and an elongated member extending through the aperture and axially slidable therein and having one end protruding from the extended piston rod in the same direction as the cylinder extension and formed with means for gripping a stud or the like, a collar surrounding the elongated member and bearing against the opposite protruding end of the piston rod and means for applying tensile force between the elongated member and the collar and thus urging the piston rod and piston axially in the cylinder toward the stud-mounting surface, a hydraulic pressure gauge communicating with the cylinder between the piston and the end wall of the cylinder nearer the stud-mounting surface and hydraulic fluid in the same portion of the cylinder, whereby tension applied to the stud by the elongated member causes movement of the piston rod and piston toward the stud-mounting surface increasing pressure on the hydraulic fluid in the cylinder readable upon the gauge and thus proportional to tension applied to the stud.

BRIEF DESCRIPTION OF THE DRAWINGS:

FIG. 5 is a top view of a third preferred embodiment of the invention.

FIG. 6 is a diametral sectional view taken along line 6—6 of FIG. 5.

FIG. 7 is a horizontal sectional view taken along line 7—7 of FIG. 6.

FIG. 8 is a fragmentary vertical sectional view showing a modified form of gripping device applied to the tool of FIGS. 5-7.

FIG. 9 is a horizontal sectional view taken along line 9—9 of FIG. 8.

DETAILED DESCRIPTION OF THE INVENTION

Figure 1:
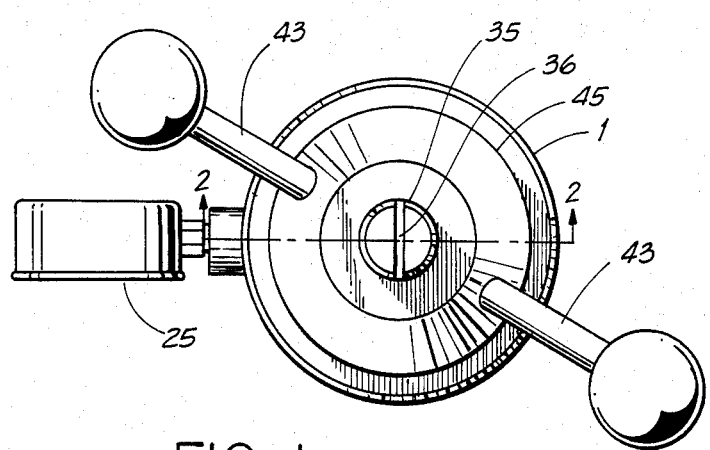
FIG. 1 is a top view of a tool embodying the invention.
Figure 2:
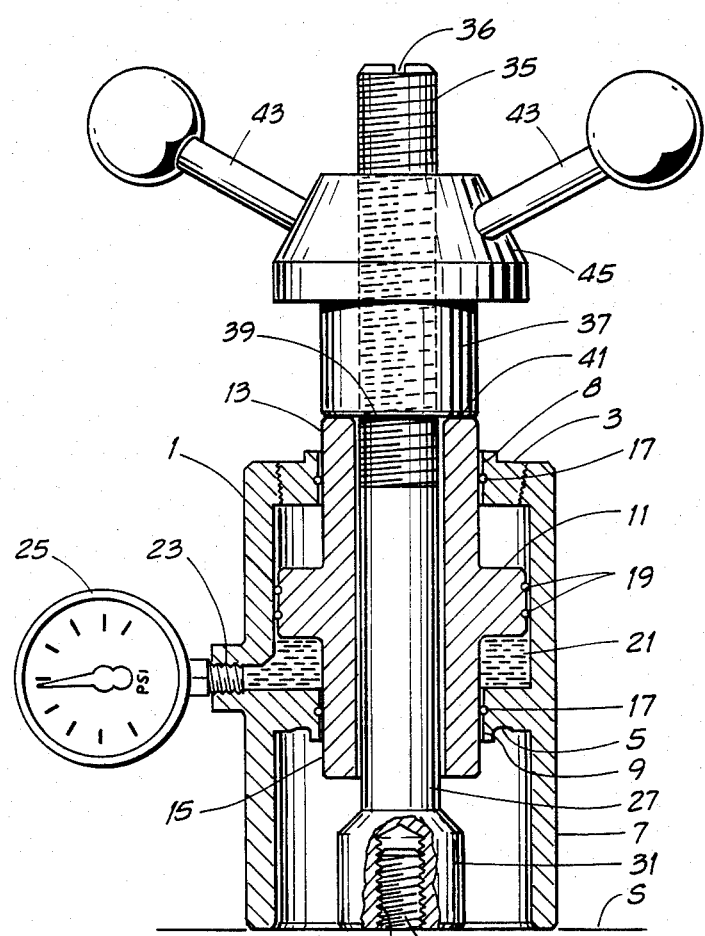
FIG. 2 is a diametral sectional view of the embodiment illustrated in FIG. 1, taken along line 2—2 of FIG. 1.

Referring to FIGS. 1 and 2, the numeral 1 discloses a cylinder having spaced centrally apertured end walls 3 and 5 and a longitudinal extension 7 from the end walls forming a base adapted to engage a stud-mounting surface S from which a stud or other fastener F projects. Cylinder end wall 3 is threadably mounted in the cylinder to permit its removal when desired and both end walls 3 and 5 are formed with circular apertures 8 and 9 respectively, aligned with each other axially of the cylinder and a piston assembly comprising a piston 11 and integral axially extending piston rods 13 and 15 is mounted in cylinder 1 with piston rod 13 slidably passing through cylinder end wall 3 and piston rod 15 slidably projecting through piston wall 5. To facilitate axial movement of the piston assembly 11, 13 and 15 and, at the same time, effect a seal, apertures 8 and 9 are slightly larger than the piston rod and mount O-rings 17 in annular grooves in their inwardly facing surfaces and piston 11 mounts a pair of O-rings 19 in suitable annular peripheral grooves for sealing engagement with the inner wall of cylinder 1 so as to prevent the passage of hydraulic fluid 21 in the cylinder between piston 11 and cylinder end wall 5. Adjacent end wall 5 cylinder 1 is formed with a threaded radial aperture 23 to which is threadably secured a hydraulic pressure gauge 25 such that pressure on hydraulic fluid 21 caused by downward movement in cylinder 1 of piston 11 will be read on pressure gauge 25. For applying tension to the stud, an elongated rod 27 passes through a central axial aperture 29 in piston and piston rod assembly 11, 13, 15 and is enlarged at the end adjacent cylinder extension 8 as at 31 and is there internally threaded as at 33 for threadable engagement with stud F. The opposite end portion of rod 27 is threaded as at 35 and a collar 37 is threadably mounted on rod 35 with one axially facing surface 39 abutting the adjacent end surface 41 of piston rod 13 and a pair of handles 43 extend radially from a frustoconical end portion 45 of collar 37 so that when rod 27 is secured by its threads 33 to stud F, rotation of collar 37 by handles 43 applies tension to rod 27 and stud F and collar 37 reacts against piston rod 13, causing piston 11 to move axially in cylinder 1 toward cylinder end wall 5, thereby increasing hydraulic pressure of fluid 21 as read on gauge 25 and the pressure is proportionate to the tension applied to stud F.

Operation of the embodiment of FIGS. 1 and 2 is as follows: The cylinder extension 7 is seated against the surface S from which the stud F projects with the stud substantially centered with respect to the cylinder, and a screwdriver (not shown) is inserted into slot 36 in rod 27 which is thereby rotated to secure the threaded gripping end of rod 27 to stud F. Thereupon handles 43 are utilized to rotate collar 37 into engagement with the adjacent annular surface of piston rod 13 to exert a pull on stud F reacting against piston rod 13 and producing pressure on the fluid 21 in cylinder 1 proportional to the tension applied to stud F. By returning the pressure on hydraulic pressure gauge 25, the tension applied to stud F can be measured.

Figure 3:
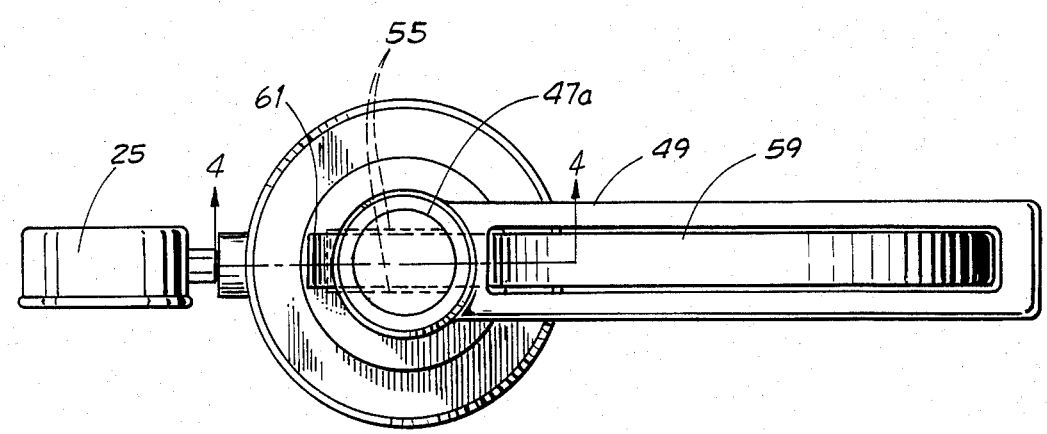
FIG. 3 is a top view of a second embodiment of the invention.
Figure 4:
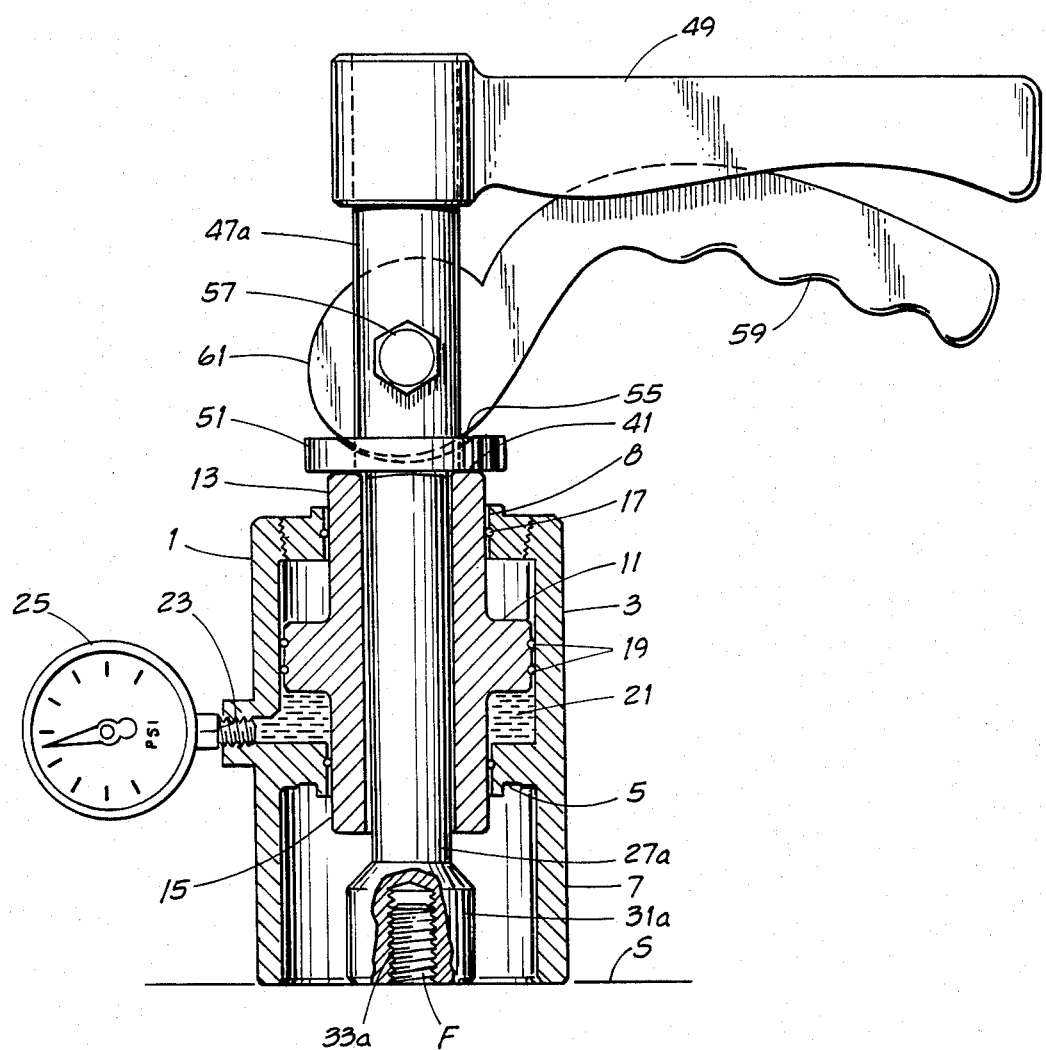
FIG. 4 is a diametral sectional view of the embodiment illustrated in FIG. 3, taken along line 4—4 of FIG. 3.

In the second embodiment of the invention shown in FIGS. 3 and 4, the cylinder, piston and gauge are identical to that of FIG. 1 and bearing corresponding reference numerals. The tension rod 27a like tension rod 27 of FIGS. 1 and 2 terminates in an enlarged end portion 31a internally threaded as at 33a for threadably gripping engagement with stud F, but the opposite end portion 47a of rod 27a is of larger diameter than the lower portion of rod 27a and is provided at its end with a fixed radially extending handle 49. A collar 51 suitably apertured at 53 to surround end portion 47 of rod 27a is seated against the end surface 41 of piston rod 13 and is formed with an arcuate depression 55 concentric with a bolt 57 which passes through rod end portion 47 at right angles to the direction of handle 49 and a handgrip lever 59 has one end bifurcated to form a pair of eccentric cams 61 rotatably mounted on bolt 57 and engageable with the depression 55 in collar 51 so that when lever 59 is gripped to pull it counterclockwise, as viewed in FIG. 4, larger diameter portions of the surfaces of cam 61 will engage depression 55 in collar 51 tending to pull rod 27a upwardly and thereby increase the tension on stud F and reacting through collar 51 on piston assembly 11, 13, 15 to increase the pressure of piston 11 on fluid 21 in cylinder 1 which is thereby readable on pressure gauge 25 and shows a pressure directly proportional to the tension applied to stud F.

Operation of the embodiment of FIGS. 3 and 4 is similar to that of FIGS. 1 and 2 except that tension is applied by gripping handle 49 and lever 59 to apply upward tension to rod 27a and a corresponding reaction to piston assembly 11, 13, 15.

In the third, and preferred, embodiment of the invention shown in FIGS. 5–7, the same numerals used in FIGS. 1 and 2 are used for corresponding parts and the cylinder and piston construction is similar to those of FIGS. 1–2, but the tension rod 27b is differently constructed from tension rods 27 of FIGS. 1 and 2 so as to mount different types of gripping elements, generally indicated at 61 in FIGS. 6 and 7 and 107 in FIGS. 8 and 9, but the base 63 is separate from the cylinder 1b and is bolted to the bottom of cylinder 1b through an oval plate 65 which forms part of a gauge guard having an upright cylindrical wall 67 surrounding hydraulic pressure gauge 25b.

Tension rod 27b is formed with a central hole in which is slidably received collet mounting rod 69, the upper end 71 of which projects upwardly from the reduced upper end portion 73 of tension rod 27b and is secured to a downwardly open cup-shaped cap 75 on which is mounted a knob 79 which slidably receives the reduced upper end 73 of tension rod 27b and a spring 81 seated on top of tension rod upper end portion 73 within cap 75 biases the latter and collet mounting rod 69 upwardly for a purpose which will become evident herein below.

At its lower end tension rod 27b is flanged as at 83 and formed with a threaded end portion 85 to which is threadably secured the upper end of a cylindrical collet seat member 87, the lower end of which is inwardly tapered as at 89 and a collet consisting of four longitudinally divided segments 91 internally threaded as at 93 with their lower ends tapered as at 95 is positioned within seat member 87 and is connected by means of an expansion ring 97 to a collar 99 which is secured by a pin 101 to the lower end of collet attachment rod 69. An O-ring 102 in an annular groove in collar 99 retains pin 101 in place. Expansion ring 97 is seated in aligned annular grooves in collet 91 and collet seat member and braces collet segments 91 outwardly to enlarge the threaded opening therein. The collet segments 87 are held in assembled relation by compression ring 98. With this arrangement, the tool can be readily applied to threaded studs by seating base 63 against the stud mounting surface in concentric relation with the stud so that as the stud enters the threaded center of the collet by pressing knob 79 downwardly toward the stud-mounting surface S the collet seat is caused to engage the tapered lower end of the collet and so that the collet threads grippingly engage the threads of the stud. As the handles 43 are rotated to apply tension to the tension rod 27b, this causes the collet seat member 87 to hold the collet in gripping relation with the stud F so that the tension applied to the tension rod 27b by rotating handles 43 and collar 37 will be applied to stud F and can be measured by reading the hydraulic pressure shown on pressure gauge 25b.

For preventing rotation of collet seat member 87 with respect to base 63, base 63 is formed with an axial slot 103 in which is slidably received a projection 105 on collet seat member 87.

A modified form of gripping device 107 is illustrated in FIGS. 8 and 9 in which the gripping device is a cylindrical block apertured and internally threaded as at 109 for securement to the threaded lower end 85 of tension rod 27b and formed with a radial boss 115 for slidable anti-rotative reception in base slot 103. Cylindrical block 107 is formed with a T-shaped opening from the same side as boss 115 consisting of an axial stem portion 111 and a transverse head portion 113, the inner ends of which are semi-cylindrical as best seen in FIG. 9 and block 107 is formed with a radial projection 115 slidably receivable in slot 103 in base 63.

The operation of the device of FIGS. 5–7 is as follows: The tool is placed on stud mounting surface S with base 63 concentric with the stud so that the stud F projects into the central opening in collet 91, and spring 88 urges collet seat member 87 against stud mounting surface S. Knob 79 is used by the operator to push collet 91 downwardly against the stud mounting surface so as to collapse it and grippingly engage the stud S during initial rotation of collar 37 by means of handles 43, whereby tension rod 27b is drawn away from the stud mounting surface, at which time further upward movement of collet 91 relative to stud F is prevented by the gripping engagement of the collet thread with the stud threads and the collet is held in collapsed condition by engagement of the tapered surface 89 of the collet seat member end 95 of the collet segments, at which time knob 79 can be released and further rotation of collar 45 by handles 43 applies tension to the stud and downward compressive movement to piston 11, increasing hydraulic pressure shown upon gauge 25b directly proportional to the tension applied to the stud.

If the device is to be used with headed studs, the collet type gripping member 61 can be removed and the gripping element 107 shown in FIGS. 8 and 9 screwed onto the threaded lower end 85 of tension rod 87b, the device can be applied to the stud by sliding base 63 along the surface S until the stem of the stud extends upwardly through aperture 111 in gripping element 107 and the head of the stud is in the enlarged head cavity 113 of the gripping element, after which handles 43 are rotated to apply tension by tension rod 27b to gripping element 107 until the bottom of cavity 113 engages the bottom surface of the stud head, after which continued rotation of collar 37 by handles 43 produces tension on the stud which can be measured by reading hydraulic pressure on gauge 25b.

The details of the invention may be varied substantially without departing from the spirit of the invention and the exclusive use of such modifications as come within the scope of the appended claims is contemplated.

We claim:

1. A tool for testing fasteners such as studs protruding from a plane surface comprising a cylinder having a pair of end walls each centrally apertured and an extension at one end for engagement with the fastener mounting surface, a piston slidable in the cylinder and having rod portions extending through both end walls of the cylinder, an axial aperture through the piston and piston rods, an elongated tension member extending through the aperture and axially movable therein with both its ends protruding from said piston rod portions, the portion of said tension member protruding from said piston rod in the same direction as the cylinder extension having means for gripping a fastener, a collar surrounding said tension member and adapted to abut against the end of the piston rod remote from the cylinder extension and means for forcing said collar against the adjacent end of the adjacent piston rod, thus applying tension to said tension member and fastener and urging the piston rod and piston axially in the cylinder toward the fastener mounting surface, a hydraulic pressure gauge communicating with the cylinder between the piston and the end wall of the cylinder between the piston and the fastener mounting surface, hydraulic fluid in the same portion of the cylinder whereby tension applied to the fastener by said tension member causes movement of the piston rod and piston toward the fastener mounting surface, thereby causing pressure on the hydraulic fluid readable upon said gauge and indicative of the amount of tension applied to the stud.

2. A tool according to claim 1, wherein the means for forcing said collar against the adjacent piston rod comprises an external thread on said tension member and a mating internal thread on said collar, said collar having means for manual rotation whereby to apply desired amounts of tension to said tension member and said fastener.

3. A tool according to claim 2, wherein said manual means comprises hand lever means projecting radially from said collar.

4. A tool according to claim 3, wherein said hand lever means comprises a pair of levers projecting in diametrally opposite directions.

5. A tool according to claim 1, wherein said means for forcing said collar against the end of the piston rod comprises a fixed radially extending handle on said tension member, a lever pivoted to said tension member on an axis transverse thereof between said handle and said collar and having an eccentric cam portion engageable with said collar upon grippping engagement of said lever and said handle to press said collar against the adjacent piston rod end surface and thereby apply tension to said tension member and the fastener gripped thereby.

6. A tool according to claim 1, wherein said gripping device comprises an internally threaded axially extending recess in the end of said tension member near the fastener mounting surface.

7. A tool according to claim 1 including a collet seat member secured to the end of said tension member near the fastener mounting surface and a normally expanded collet axially movable within said seat member and formed with a central axial cavity grippingly engageable with the fastener responsive to movement of said tension member and seat member away from the fastener mounting surface.

8. A tool according to claim 7, wherein said cavity in said collet is internally threaded.

9. A tool according to claim 7, wherein said collet seat member has a generally cylindrical recess receiving said collet, the end of said recess nearest the fastener mounting surface being inwardly tapered and the outer surface of said collet members being correspondingly inwardly tapered to cause compression of said collet upon engagement between its tapered surfaces and those of said collet seat member.

10. A tool according to claim 9, wherein said tension member is hollow and a collet mounting rod secured to said collet at one end extends through said tension member and protrudes from the opposite end thereof, means biasing said collet upwardly with respect to said collet seat member to permit expansion of said collet for receiving the fastener and permitting manual movement of said collet toward the fastener mounting surface and compression thereof by said collet seat member to grip the fastener prior to initiation of manually induced movement of said tension member away from the fastener mounting surface.

11. A tool according to claim 10, wherein said collet comprises a plurality of radially divided segments, a cylindrical core positioned in the end of said collet remote from the fastener mounting surface, said core being removably secured to said collet mounting rod, annular compression ring means surrounding said collet and expansion ring means resiliently biasing said collet segments radially outwardly whereby to maintain said collet fully expanded to receive a fastener in its internally threaded center except when it is compressed by engagement of the collet tapered end surfaces with the internally tapered end surfaces of said collet seat member.

12. A tool according to claim 11 including resilient means normally bearing said collet away from compressing engagement with said seat and manual means for selectively opposing said resilient means whereby to cause said collet to compress and grippingly engage the fastener prior to initiation of movement of said tension member away from the fastener-mounting surface.

13. A tool according to claim 12, including means for threadably securing aid collet seat member to said tension member and cooperating means on said collet seat member and said cylinder extension holding said collet seat member against rotation with respect to the tool.

14. A tool according to claim 11, wherein said collet cylindrical core is formed with an axial bore receiving the adjacent end of said collet mounting rod and said core and said collet mounting rod are formed with aligned diametral holes, there being a pin extending through said holes for removably securing said collet core to said collet mounting rod. an annular groove in said collet core intersecting the outer ends of said diametral hole therein, and an elastomeric O-ring positioned in said groove to retain said pin in said aligned holes.

15. A tool according to claim 1, wherein said gripping device comprises a block secured to said tension member and formed with an axially and radially extending cavity open toward the fastener mounting surface and toward one side of said block and the end of said cavity remote from the fastener mounting surface is enlarged to receive the head of a headed stud.

16. A tool according to claim 1, wherein said pressure gauge extends radially from said cylinder and is of generally cylindrical shape with its axis generally parallel to the axis of said cylinder and its dial facing away from the fastener mounting surface, a guard for said gauge comprising a plate projecting from said cylinder between aid gauge and the fastener mounting surface and a cylindrical, upstanding rim on said plate surrounding said gauge.

17. A tool according to claim 16, wherein said cylinder and said extension are separate members and said plate is interleaved between said cylinder and said extension.

* * * * *